(12) United States Patent
Brogan

(10) Patent No.: US 10,155,877 B2
(45) Date of Patent: Dec. 18, 2018

(54) MATERIALS, TREATMENT COMPOSITIONS, AND MATERIAL LAMINATES, WITH CARBON NANOTUBES

(71) Applicant: C-Bond Systems, LLC, Houston, TX (US)

(72) Inventor: Paul H. Brogan, The Woodlands, TX (US)

(73) Assignee: C-Bond Systems, LLC, Houston, TX (US)

( * ) Notice: Subject to any disclaimer, the term of this patent is extended or adjusted under 35 U.S.C. 154(b) by 0 days.

(21) Appl. No.: 15/033,625

(22) PCT Filed: Oct. 29, 2014

(86) PCT No.: PCT/IB2014/065690
§ 371 (c)(1),
(2) Date: Apr. 30, 2016

(87) PCT Pub. No.: WO2015/063701
PCT Pub. Date: May 7, 2015

(65) Prior Publication Data
US 2016/0251536 A1 Sep. 1, 2016

Related U.S. Application Data

(60) Provisional application No. 61/962,064, filed on Oct. 30, 2013, provisional application No. 62/186,317, filed on Jun. 29, 2015.

(51) Int. Cl.
| | |
|---|---|
| C08K 5/15 | (2006.01) |
| C09D 131/04 | (2006.01) |
| B32B 17/10 | (2006.01) |
| C03C 17/30 | (2006.01) |
| C09J 131/04 | (2006.01) |
| C09J 4/06 | (2006.01) |
| C08K 3/04 | (2006.01) |

(52) U.S. Cl.
CPC ...... *C09D 131/04* (2013.01); *B32B 17/10018* (2013.01); *B32B 17/10926* (2013.01); *C03C 17/30* (2013.01); *C09J 131/04* (2013.01); *B32B 2367/00* (2013.01); *C08K 3/041* (2017.05); *C09J 4/06* (2013.01)

(58) Field of Classification Search
USPC .......................................................... 524/114
See application file for complete search history.

(56) References Cited

U.S. PATENT DOCUMENTS

| | | | |
|---|---|---|---|
| 4,030,258 A | 6/1977 | Anders | |
| 4,374,879 A | 2/1983 | Roberts et al. | |
| 5,342,872 A | 8/1994 | Huber | |
| 5,368,904 A | 11/1994 | Stephinson | |
| 5,445,890 A | 8/1995 | Bayha et al. | |
| 5,580,819 A | 12/1996 | Li | |
| 6,013,333 A | 1/2000 | Carson et al. | |
| 6,030,671 A | 2/2000 | Yang et al. | |
| 6,174,977 B1 | 1/2001 | Ariyoshi et al. | |
| 6,565,980 B1 | 5/2003 | Ackermann | |
| 6,620,890 B1 | 9/2003 | Yamashita | |
| 7,462,664 B2 | 12/2008 | Smith et al. | |
| 7,867,605 B2 | 1/2011 | Moran et al. | |
| 7,968,039 B2 | 6/2011 | Tsuda et al. | |
| 8,025,826 B2 | 9/2011 | Choi et al. | |
| 8,632,886 B2 | 1/2014 | Barton et al. | |
| 8,685,535 B2 | 4/2014 | Niimi et al. | |
| 8,722,185 B2 | 5/2014 | Niwa et al. | |
| 8,871,335 B2 | 10/2014 | Anderson et al. | |
| 8,962,136 B2 | 2/2015 | Takahira et al. | |
| 9,011,995 B2 | 4/2015 | Park et al. | |
| 9,012,549 B2 | 4/2015 | Tanaka et al. | |
| 2002/0035177 A1 | 3/2002 | Kishioka et al. | |
| 2003/0035917 A1 | 2/2003 | Hyman | |
| 2003/0065086 A1 | 4/2003 | Kosal | |
| 2004/0214947 A1 | 10/2004 | Lewno | |
| 2005/0281998 A1 | 12/2005 | Baker | |
| 2006/0079645 A1 | 4/2006 | Hasegawa et al. | |
| 2006/0124028 A1* | 6/2006 | Huang ................... | B82Y 30/00 106/31.92 |
| 2008/0255017 A1* | 10/2008 | Dettinger ................ | A61L 9/05 510/191 |
| 2008/0276497 A1* | 11/2008 | Chou ...................... | A43B 9/12 36/30 A |
| 2009/0297832 A1 | 12/2009 | Hatta et al. | |
| 2009/0305058 A1 | 12/2009 | Marumoto | |
| 2010/0031810 A1 | 2/2010 | Neal | |
| 2011/0000279 A1 | 1/2011 | Miyazaki et al. | |
| 2011/0217558 A1 | 9/2011 | Brogan | |

(Continued)

FOREIGN PATENT DOCUMENTS

EP 1719808 A2 11/2006

OTHER PUBLICATIONS

Laura McJilton et al, Nebulization of Single-Walled Carbon Nanotubes for Respiratory Toxicity Studies, Carbon 47 (May 3, 2009) 2528-2555, Elsevier.

(Continued)

*Primary Examiner* — Hui Chin
(74) *Attorney, Agent, or Firm* — Anthony W. Hong

(57) ABSTRACT

Improved materials and compositions for improving materials to enhance their properties; the compositions, in certain aspects, strengthening materials, enhancing bonding between materials, and/or improving properties such as strength, impact resistance, sustainability, protection level, and structural integrity; the material in certain aspects being glass; the compositions including alcohol, glycerol, a silane, acetate adhesive, a surfactant, and carbon nanotubes; and, optionally in certain aspects, no nanotubes and/or no surfactants but with a vinyl acetate monomer. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

25 Claims, 2 Drawing Sheets

(56) References Cited

U.S. PATENT DOCUMENTS

| | | | |
|---|---|---|---|
| 2012/0085482 A1 | 4/2012 | Cadwallander et al. | |
| 2012/0104330 A1* | 5/2012 | Choi | H01B 1/22 252/512 |
| 2014/0037951 A1 | 2/2014 | Shigetomi et al. | |
| 2014/0141260 A1* | 5/2014 | Henry | C03C 17/30 428/429 |
| 2014/0308452 A1 | 10/2014 | Schumann et al. | |

OTHER PUBLICATIONS

L. Zeng et al, Tailoring Aqueous Solubility of Functionalized Single-Wall Carbon Nanotubes over a Wide pH Range through Subs. Chain Length, Nano Letters 0 (Sep. 16, 2005) A-D, ACS.

F. Liang et al., A Convenient Route to Functionalized Carbon Nanotubes, Nano Letters 4 (Jun. 3, 2004) 1257-1260, ACS.

ChemSpider Ethanol NPL document, retrieved Jul. 3, 2017.

Acme-Hardesty Glycerin NPL document, retrieved Jul. 3, 2017.

ChemicalBook Mineral Oil NPL document, retrieved Jul. 3, 2017.

Fluorad NPL document, retrieved Jul. 3, 2017.

Sigma-Aldrich NPL document, retrieved Jul. 3, 2017.

PolymerProcessing NPL document, retrieved Jul. 3, 2017.

Strom, et al., Nitrene addition to exfoliated graphene: a one-step route to highly functionalized graphene, ChemComm 46 (2010) 4097-4099, Royal Society of Chemistry.

Vogelson, et al., Inorganic-Organic Hybrid and Composite Resin Materials Using Carboxylate-Alumoxanes as Functionalized Cross-Linking Agents, Chem. Mater. 12 (2000), 795-804.

Jafry, et al., Simple Route to Enhanced Photocatalytic Activity of P25 Titanium Dioxide Nanoparticles by Silica Addition, Environ. Sci. Technol. 45 (2011), 1563-1568, ACS.

Niyogi, et al., Solution Properties of Graphite and Graphene, J. Am. Chem. Soc. 128 (2006), 7720-7721, ACS.

Chattopadhyay, et al., Graphite Epoxide, J. Am. Chem. Soc. 130 (2008), 5414-5415, American Chemical Society.

Hamilton, et al., High-Yield Organic Dispersions of Unfunctionalized Graphene, Nano Letters 9 (2009), 3460-3462, American Chemical Society.

Hamilton et al, Radical Addition of Perfuorinated Alkyl Iodides to Multi-Layered Graphene and Single-Walled Carbon Nanotubes, Nano Res (2010) 3:138-145.

* cited by examiner

MATERIALS, TREATMENT COMPOSITIONS, AND MATERIAL LAMINATES, WITH CARBON NANOTUBES

CROSS-REFERENCE TO RELATED APPLICATIONS

This application is a 371 of PCT/IB2014/065690, filed on Oct. 29, 2014, which claims priority of provisional patent application 61/962,064, which was filed on Oct. 30, 2013. This application further claims priority to provisional patent application 62/186,317, which was filed on Jun. 29, 2015.

BACKGROUND OF THE INVENTION

1. Field of the Invention

This invention is directed to: compositions for treating materials, e.g. for strengthening materials, for increasing sustainability, for increasing structural integrity, and for increasing adhesion between materials such as, but not limited to, adhesion between a film and a layer or pane of material, e.g. glass, and for increasing adhesion between adjacent panes or layers of materials, e.g., glass; such a compositon that is an aqueous composition with carbon nanotubes therein; such compositors for increasing protection levels of materials and strength properties; such compositions for treating porous materials, e.g., but not limited to, cement, concrete, fingernails, and toenails; laminates; multi-layer laminates; glass laminates; materials for enhancing the lamination of multiple layers of materials or panes of glass; to laminates, e.g. glass laminates, for use in safety and security applications; to chemical compositions for facilitating such properties and/or such lamination; and to such compositions with carbon nanotubes.

2. Description of Related Art

There is a wide variety of known glass laminates and materials and compositions for enhancing such lamination. Strengthened glass laminates were introduced in the early 1900s and are used today in safety and security glass applications. Impact resistant glass laminates are used in buildings and in structures, and for use in automobile glass, and for safety and security applications.

Impact resistant glass laminates have been constructed using alternating layers of glass and materials, e.g., plastic sheeting with adhesive interlays. Some known bullet resistant glass is made with several glass sheets connected together with polyvinyl butyral sheets and with a polycarbonate layer bonded on an inside face of the final glass sheet using a thermoplastics polyurethane layer. The polycarbonate layer provides additional strength, and to a small degree, elasticity, to the glass upon impact and provides resistance to spalling. Alternating layers of glass and plastic can be cumbersome due to their size and weight.

Some innovations in safety and security glass laminates have focused on improving performance (i.e. impact resistance) while making the glass laminates more lightweight, less bulky, and less expensive to produce in mass quantities.

Some known glass laminates have a polyester film, such as Mylar(trademark) film, applied to a single glass sheet to increase overall strength and bullet resistance of the glass. The polyester film is usually pre-coated with an adhesive, such as an acrylic resin, which permits the polyester film to be bonded to one side of a glass sheet by applying a mild pressure. Normally, a soap and water solution is applied to the surface of the glass to be covered by the polyester film, and in some cases, to the adhesive surface of the polyester film. After the film is applied to the glass, the soap and water solution allows the polyester film to be slightly moved and properly aligned on the glass surface with greater ease prior to the setting of the adhesive. Excess soap and water solution is removed from between the film and glass surfaces. Any air bubbles are removed that may have developed between the film and the glass upon application.

A glass laminate structure is highly desirable which combines impact resistant properties within a lightweight, compact, and optically transparent structure.

SUMMARY OF THE INVENTION

The present invention, in certain aspects, discloses a composition for treating a layer or layers of materials (e.g., layers or panes of glass, LEXAN (trademark) material, polycarbonate material, and acrylic material), the composition including, inter alia, a silane (or organosilane), an alcohol, a glycerol, an acetate adhesive (e.g. vinyl acetate monomer, polyvinyl acetate, or vinyl acetate ethylene emulsion), a surfactant or surfactants, and carbon nanotubes. In certain embodiments, the composition also includes essential oil(s) and/or blends of essential oil(s). Optionally, the surfactant(s) and/or nanotubes are deleted, e.g. in certain aspects, but not limited to, when vinyl acetate monomer adhesive is used. Such a composition according to the present invention is mixed with water and then applied to a layer of material (e.g., but not limited to, glass) or to a surface or surfaces of a layer or layers (or a pane or panes) that are laminated together.

Any suitable alcohol may be used. Any suitable glycerol may be used. Any suitable surfactant(s) may be used, including, but not limited to, anionic surfactants, cationic surfactants, ampholytic surfactants, non-ionic surfactants, alkylsulfuric acid surfactants of 10 to 14 carbon atoms (such as alkyl sulfates), dodecanesulfonic acid, dodecanoylsarcosine, dodecanoic acid, cholic acid, salts thereof, for example, such as sodium salts, sodium dodecylsulfate, sodium decylsulfate, sodium dodecyl-benzenesulfonate ("SDBS surfactant"), sodium tetradecylsulfate, n-dodecylphosphocholine. A surfactant can be advantageous for filling in micro-fissures in a glass surface and can help to better penetrate small surface fissures. Surfactants reduce the surface tension of water. Exemplary surfactants include, but are not limited to, DOW ZONYL FSH or FSJ or other commercial surfactants. A composition according to the present invention may use a range of from about 1 ml to about 30 ml or even more, of surfactant per U.S. gallon (3.785 liter) of solvent. DOW Zonyl FSH is illustrative of nonionic fluorosurfactants. The concentration of surfactant(s) in certain aspects of a final composition according to the present invention can range between 0.005% to 5% weight percent.

The carbon nanotubes in compositions according to the present invention may be any suitable known carbon nanotubes; including, but not limited to, single walled nanotubes and multi-walled nanotubes; and the nanotubes may be present at any desired loading level in the composition, e.g., but not limited to, from 0.1 to 90 weight percent of the composition; 4 to 15 weight percent of the composition; 0.1 to 2 weight percent of the composition; or between 50 mg to 200 mg per gallon of final composition. In one particular aspect, the loading level is such that apparent transparency of a resulting glass layer or layers is not adversely affected.

A relatively small amount of a composition according to the present invention is mixed with a larger amount of water to form a final composition that is usable with glass layer(s). The various components of the composition are combined and then the resulting mixture is mixed to disperse the carbon nanotubes throughout the mixture, e.g., with known high shear mixers and techniques and with known sonication and techniques, so that re-agglomeration of the carbon nanotubes is inhibited and a stable suspension of nanotubes in liquid is produced. At any time an essential oil or oils and/or a blend of essential oils is added to the mixture. Many such oils impart a pleasing fragrance to the mixture.

In certain aspects, a final composition according to the present invention is coated onto a layer of glass, onto one or both surfaces of the glass, and/or onto surfaces of multiple layers of glass that are then combined one onto the other, with coating between adjacent layers. Excess coating material may be removed. In certain aspects, sufficient material is used so that material penetrates pores of a layer of material, e.g., but not limited to, pores in a pane or layer of glass, and remains in and/or fills the pores. In certain aspects, the coating, after drying is between 0.01 microns to 10 microns thick.

In other aspects, a multi-layer glass structure is produced in which any surface or surfaces of any particular glass layer has a coating of a composition according to the present invention, and, in one particular aspect, there is a coating of the composition between each two adjacent glass layers, with or without such a coating on one or both outermost surfaces of the structure, in any such embodiment, sufficient composition material may be used so that pores of the material are filled in.

In certain aspects, a composition according to the present invention is used with polyester film/glass sheet constructions. Optionally, a suitable copolyester film may be used. The composition is applied to glass onto which a polyester sheet is to be applied and to the adhesive side of a polyester film. A glass laminate structure is produced.

It is, therefore, an object of at least certain preferred embodiments of the present invention to provide:

New, useful unique, efficient, nonobvious: aqueous compositions with carbon nanotubes therein for treating materials, e.g. for strengthening materials, for increasing sustainability, for increasing structural integrity, for increasing protection levels of materials and strength properties, and for increasing adhesion between materials; such compositions for treating e.g., sheet materials, glass, and porous materials; and New, useful, unique, efficient, nonobvious: compositions for producing improved laminates; compositions for strengthening materials, e.g. but not limited to glass and other layered materials, and compositions that contain a silane, an alcohol, a glycerol, a surfactant, an acetate adhesive, and carbon nanotubes.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated.

There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention. The present invention and its diverse embodiments recognize and address the long-felt needs and provides a solution to problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later disguise it by variations in form, changes, or additions of further improvements.

It will be understood that the various embodiments of the present invention may include one, some, or any possible combination of the disclosed, described, and/or enumerated features, aspects, and/or improvements and/or technical advantages and/or elements in claims to this invention.

BRIEF DESCRIPTION OF THE DRAWINGS

The invention may be understood by reference to the following description taken in conjunction with the accompanying drawings, in which, like reference numerals identify like elements. These drawings illustrate certain embodiments of the present invention and are not to be used to improperly limit the scope of the invention which may have other equally effective or legally equivalent embodiments. In the appended figures, similar components and/or features may have the same numerical reference label. Various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

By way of illustration and not limitation, the invention is described in detail hereinafter on the basis of the embodiments represented in the accompanying figures, in which.

DESCRIPTION OF EMBODIMENTS OF THE INVENTION

Figure 1A:
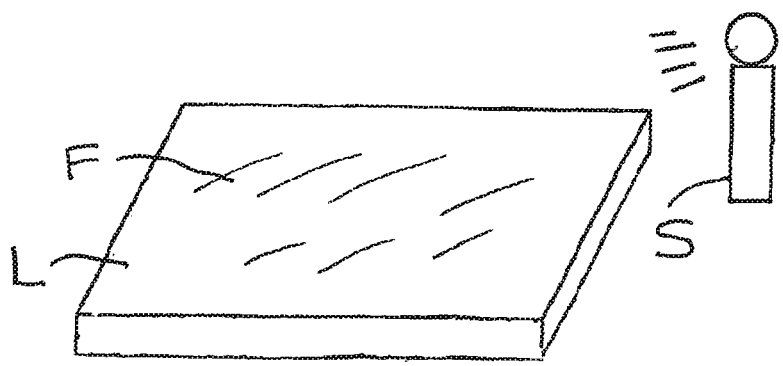
FIG. 1A is a perspective view of a glass layer to which a final composition of the present invention is applied.

In one embodiment, a composition according to the present invention was made by mixing together 3.0 cc of glycerol (99% pure synthetic, e.g., as commercially available from ACROS Organics as CAS 56-81-5); 10.0 cc of a silane, 3-glycidoxypropyl-trimethoxysilane (e.g., as commercially available from Gelest, Inc. as 215-547-1015); and 3.785 liters of water-which components were stirred gently and allowed to set for 24 hours. To this was then added 2.0 cc of 91% Isopropanol; 0.500 cc of vinyl acetate monomer adhesive (e.g., as commercially available as PC6694 W VAM from Clifton Adhesives company); and 200 microliters of an essential oils containing 50% rose absolute oil and 50% frankincense oil.

Three final solutions—A, B, and C—were then made by adding surfactant (e.g. SDBS surfactant; one-tenth of one percent by total water weight) and carbon nanotubes (commercially available SMW 200 multi-walled carbon nanotubes as available from SW NanoTechnologies, Inc.) and additional sufficient distilled water to produce a gallon of solution and mixing these ingredients using high shear mixing (for 30 minutes) and sonication (for 30 minutes) to achieve stable suspensions. The amount of nanotubes in each final composition is as follows:

A: 50 mg/gallon
B: 125 mg/gallon
C: 200 mg/gallon

No reduction in glass visibility of any of the three compositions was visible to the eye after each was applied to glass; and mixtures A and B had no settlement of CNTs after 24 hours, while mixture C had some minimal settling (0.01 ml in 9 ml sample) after 24 hours. Using a light transmittance detector Light Emittance (in Ft-cd) and Light Blocked (in Ft-cd) (two readings each) due to CNTs were determined, providing data for each composition, the compositions being applied onto thin transparent film (dried 24 hours) and then the film with composition was applied to one side of glass, with measured light transmittance results as follows ("Control" was clear glass with no composition applied):

|  | Light Emittance |  | Light Blocked |  |
| --- | --- | --- | --- | --- |
| Control | 50.1 | 50.1 |  |  |
| A | 49.9 | 49.8 | 0.2 | 0.3 |
| B | 49.7 | 49.7 | 0.4 | 0.4 |
| C | 49.5 | 49.4 | 0.6 | 0.7 |

For strength testing, the "A" final composition was applied to clean, heated (e.g. to 125 degrees F.) glass 3/32 inch thick, coated on both sides of the glass by spraying. The final thickness of the glass is almost identical to the thickness of pre-coated glass since the coating is absorbed into the glass surface. Strength tests were done according to ASTM Standard 1499 with results as follows ("Control" glass with no coatings; "X" glass with coatings of a final composition with no carbon nanotubes; "% Improved" indicating strength increase over Control glass):

$$\text{Plain Glass Control} \quad \frac{\text{\% Improved}}{53\%} \text{ (baseline)}$$
$$\text{A}$$

Using a composition as above according to the present invention without surfactant except as added with the nanotubes, a strength increase of 30% was achieved.

Using a composition as above according to the present invention, but without vinyl acetate adhesive, a strength increase of 25% was achieved.

Using a composition according to the present invention as follows, a strength increase of 20% was achieved: Isopropanol, 91%; glycerol 2.0 cc; surfactant 20.0 cc; vinyl acetate adhesive, 20.0 cc; essential oils, 200 ml (without carbon nanotubes and without added surfactant as above for composition A).

It is within the scope of the present invention compositions, e.g., as in compositions A, B, and C above, for the following components to be present in the following ranges, per gallon of final solution:

Alcohol: 1 cc to 30 cc
Glycerol: 0.5 cc to 25 cc
Silane or organosilane 3 cc to 60 cc
Surfactant: 15 cc to 200 cc
Essential Oils: 0.5 ml or cc to 250 ml or cc FIG. 1A shows a glass layer L to which a film F of a composition according to the present invention is applied using a sprayer S. The film is of any desirable thickness as disclosed herein and it is dried for any suitable time period as disclosed herein. The film F is not shown to scale and is exaggerated in size as shown in FIGS. 1A and 1B.

Figure 1B:
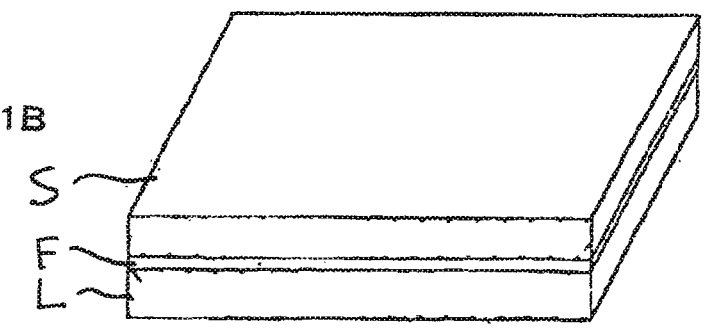
FIG. 1B shows a perspective view of the glass layer of FIG. 1A with a final composition according to the present invention adhered to another glass layer according to the present invention.

As shown in FIG. 1B, the glass layer L is adhered to another glass layer S with the film F between the two layers. Any suitable known adhesive(s) may also be used between the glass layers with the film F.

Figure 2:
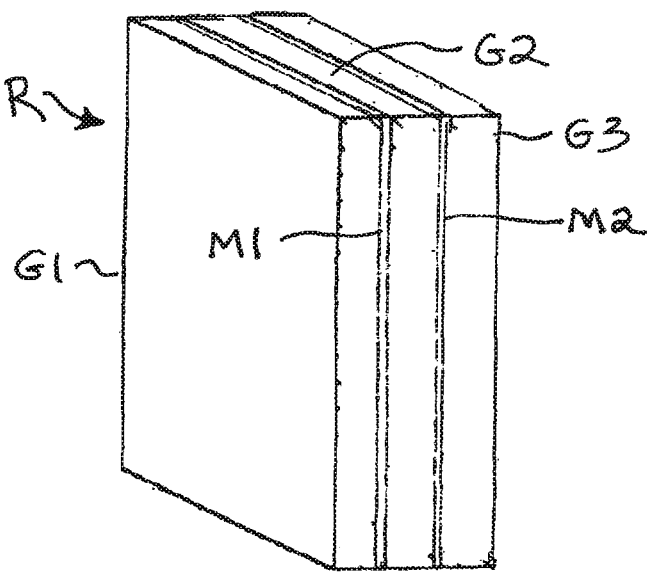
FIG. 2 shows a perspective view of a glass structure according to the present invention with multiple glass layers.

FIG. 2 shows a glass structure R according to the present invention with multiple glass layers G1, G2, G3 between which are film M1 and M2 (not to scale; shown exaggerated in thickness) made of any suitable composition according to the present invention. Any suitable known additional materials may be used between the layers as well as, but not limited to, any suitable known adhesive(s) and/or slip agent(s)—as is true for any embodiment herein. Optionally, a film M3 is used on one exterior surface of the layer G1 and such a film may also be applied to the exterior surface of the layer G3. It is within the scope of the present invention to apply such an exterior film or coating of a composition according to the present invention to any exterior surface of any structure in addition to a film or layer between adjacent layers.

Improvements to U.S. patent application Ser. No. 12/866, 722, U.S. Pub. No 2011/0217558

The present invention provides new nonobvious improvements to the subject matter of U.S application Ser. No. 12/866,722, incorporated fully herein for all purposes.

In certain aspects, the present invention provides:

a chemical composition which contains alcohol, glycol, a slip agent, carbon nanotubes, optionally surfactant(s), and a wetting agent—the chemical composition being a silane-based mixture or an acrylic-based mixture. Such embodiments of the invention can be used in combination with currently available glass laminate systems to enhance bonding and adhesion.

Such compositions can serve as adhesion promoters for glass/polyester-film bonding in a glass laminate structure and can include: between 5 and 180 milliliters of a liquid acrylic per 3,785 milliliters of said composition; between 10 and 180 milliliters of a glycol per 3,785 milliliters of composition; between 10 and 360 milliliters of an alcohol per 3,785 milliliters of said composition; between 0.25 and 20 milliliters of a slip agent per 3,785 milliliters of the composition; and water as a diluent for the composition; or 1 and 40 milliliters of a silane per 3,785 milliliters of said composition; between 0.5 and 10 milliliters of a glycol per 3,785 milliliters of said composition; between 100 and 1,500 milliliters of an alcohol per 3,785 milliliters of said composition, between 0.5 and 10 milliliters of a slip agent per 3,785 milliliters of the composition; and water as a diluent for the composition-either the acrylic-based or the silane-based also with carbon nanotubes at any loading level disclosed herein according to the present invention and, optionally, with any surfactant or surfactants disclosed herein. Such compositions in one aspect have 1% carbon nanotubes by weight.

Such compositions can be used in methods as follows: a method for strengthening the adhesive bonding between glass and plastic layers in a glass laminate structure, the method including the steps of: obtaining an adhesion promoter composition for strengthening the adhesive bonding between glass and plastic in a glass laminate structure; the adhesion promoter composition being any such according to the present invention described above; applying the promoter composition to a glass surface; placing a plastic film having an adhesive layer onto the glass surface such that the adhesion promoter composition forms a thin layer between the glass surface and the adhesive layer of the film; and optionally removing air bubbles trapped between the glass surface and the film.

Figure 3:
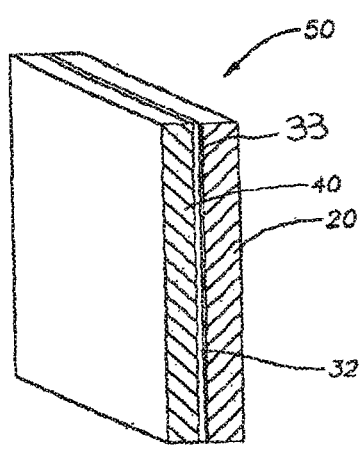
FIG. 3 is a cross-sectional view of a glass laminate structure according to the present invention

Compositions according to the present invention may be used with glass laminate systems 50, as shown in FIG. 3, in which a polyester or other plastic security film 40 is applied and bonded to the glass 20 with an adhesive 32 with a coating 33 (any composition according to the present invention) on the glass 20 and/or on the film 40. Optionally a soap and water mixture (not shown) is applied to the glass surface 20 and/or film surface 40 to be bonded in order to facilitate slight adjustment and alignment of the film 40 on the glass 20 after placement but before setting of the adhesive 32.

Figure 4:
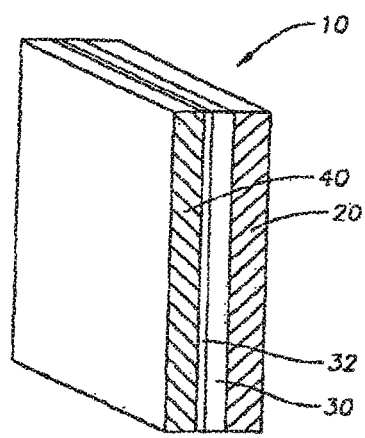
FIG. 4 is a cross-sectional view of a glass laminate structure according to the present invention.

FIG. 4 illustrates the cross-sectional view of a glass laminate structure 10 according to the present invention which has a thin layer 30 representing a composition according to the present invention applied between a polyester film 40 and a glass sheet 20 to, inter alia, enhance adhesive bonding between the polyester film 40 and the glass sheet 20 and to enhance the strength and bullet resistant properties of the overall structure 10. In one aspect, the polyester film 40 is applied to the side of the glass 20 which will not experience direct exposure to the elements that the glass laminate structure 10 is arranged and designed to resist. The composition of a preferred embodiment is applied to the glass 20 onto which the polyester sheet 40 is to be applied as well as to the adhesive side 32 of the polyester film 40. While the composition may be applied to both surfaces 20, 40, application to just the glass surface 20 or to the plastic film surface 40 is within the scope of this invention. The composition is applied to the surfaces to be mated 20, 40 by spraying the surfaces 20, 40 so that the surfaces 20, 40 are effectively saturated with the composition. A simple spray bottle (not shown) filled with the liquid composition is used to apply and evenly distribute the composition on the surfaces to be mated 20, 40; however, the liquid composition may alternatively be applied to the surfaces 20, 40 in any known manner.

The composition, as represented by layer 30 (not to scale; shown exaggerated in size), can serve a dual purpose. First, it can allow the polyester film 40 to be moved and properly aligned on the glass sheet 20 with greater ease after initial placement. Second, the composition enhances the bonding properties of the pre-coated adhesive 32 on the polyester film 40 to enhance the overall strength and bullet resistance of the glass laminate structure 10.

In one method of the invention, the glass 20 onto which the polyester film 40 is to be placed is first cleaned using any known glass cleaning method. A commercially available glass cleaner is used along with a clean towel to remove any foreign debris or grease from the glass surface 20. After the glass surface 20 is cleaned and then dried, a composition according to the present invention is applied to the glass surface 20 using a spraying technique which will evenly distribute the chemical composition on the glass surface 20. Application continues until the glass surface 20 is fully saturated with the prepared composition. Next, the polyester or other plastic film 40 to be placed on the glass surface 20 is prepared. If a commercially available polyester or other plastic security film 40 with a pre-applied adhesive layer 32 on one side is to be used, the protective layer (not shown) covering the pre-applied adhesive 32 is removed. The composition is then applied to the adhesive surface 32 of the polyester or other plastic security film 40 using a spraying technique which will evenly distribute the chemical composition on the adhesive surface 32. Application continues until the polyester surface 40 is fully saturated with the chemical composition. After the two surfaces to be mated 20, 40 are saturated with the prepared composition, the polyester or other plastic security film 40, with its adhesive side 32 toward the glass 20, is aligned and placed onto the glass 20. Before the adhesives set, the polyester or other plastic security film 40 may be moved and adjusted by sliding the film 40 over and along the glass surface 20. Once the security film 40 is properly positioned and aligned, an additional amount of the chemical composition is preferably sprayed onto the outer surface of the polyester or other plastic security film 40. A simple squeegee (not shown) or other suitable tool is then used to remove any air bubbles trapped between the film 40 and the glass surfaces 20, to remove any excess chemical composition from between the surfaces 20, 40, and to ensure that a good contact between the film 40 and the glass 20 is made before the adhesives set. The chemical composition applied to the outer surface of the security film 40 provides needed lubrication for moving the squeegee (not shown) along the outer surface of the security film 40 without unintentionally displacing the security film 40 from the glass 20. The structure is then allowed to bond and cure, e.g. for one to three days.

Figure 5:
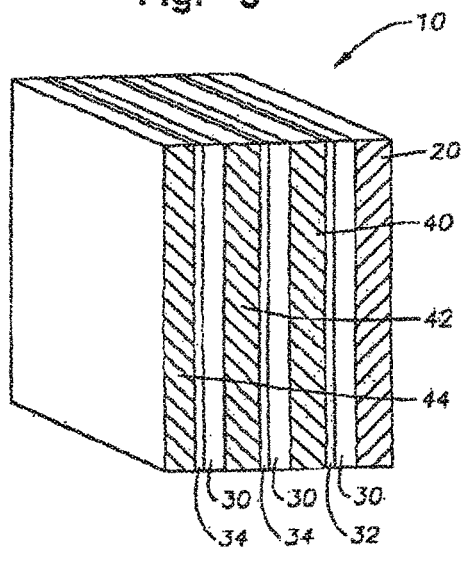
FIG. 5 is a cross-sectional view of a glass laminate structure according to the present invention.
Figure 6:
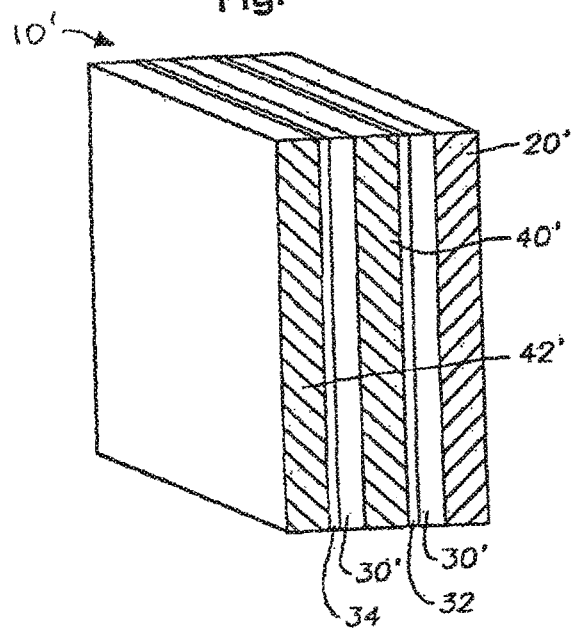
FIG. 6 is a cross-sectional view of a glass laminate structure according to the present invention.

As shown in FIG. 5, the bond created by using an embodiment of a composition according to the present invention can allow several layers of plastic security film 40, 42, 44 to be applied, for example, one 42, 44 on top of another 40, 42 for additional strength without adversely affecting the integrity or clarity of the glass 20. Thus, the composition enhances adhesive bonding between several layers of polyester or other plastic security films 40, 42, 44.

Improvements to Int'l. Patent App. No. PCT/US2012/045936 Int'l Pub. No 2011/0227558

The present invention provides new nonobvious improvements to the subject matter of International Application No. PCT/US2012/045936, incorporated fully herein for all purposes.

In certain aspects, the present invention provides a composition for strengthening glass, the composition including a silane, an adhesive, water, glycerol, alcohol, carbon nanotubes, and a surfactant; and, optionally, a defoamer. The silane can be glycidoxypropyltrimethoxysilane and the adhesive can be an acetate monomer. The present invention also provides a strengthened glass laminate, using such a composition with a base which is glass; and a coating disposed on the base, wherein the coating is a composition according to the present invention.

Accordingly, the present invention includes features and advantages which are believed to advance material treatment technology and strengthened glass technology. Characteristics and advantages of the present invention described above and additional features and benefits will, be readily apparent to those skilled in the art upon consideration of the following detailed description of preferred embodiments and referring to the accompanying drawings. What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures.

As can be easily understood from the foregoing, the basic concepts of the present invention may be embodied in a variety of ways. It involves both structures, method steps, and techniques as well as devices to accomplish the appropriate ends. Techniques and method steps according to the present invention are disclosed as part of the results shown to be achieved by the various devices and structures and described and as steps which are inherent to utilization and are simply the natural result of utilizing the devices and structures as intended and described. In addition, while some devices and structures are disclosed, it should be understood that these not only accomplish certain methods but also can be varied in a number of ways. As to all of the foregoing, all of these facets should be understood as encompassed by this disclosure.

The discussion herein is intended to serve as a basic description. The specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. These are implicitly included in this disclosure.

Where the invention is described in device-oriented or apparatus oriented terminology, each element of the device or apparatus implicitly performs a function. Apparatus claims may not only be included for the device or apparatus described, but also method or process claims may be included to address the functions the invention and each element performs. Neither the description nor the terminology is intended to limit the scope of the claims that will be included in any subsequent patent application.

It should also be understood that a variety of changes may be made without departing from the scope of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application.

It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action.

Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support". Such changes and alternative terms are to be understood to be explicitly included in the description.

Any acts of law, statutes, regulations, or rules mentioned in this application for patent; or patents, publications, or other references mentioned in this application for patent are hereby incorporated fully and for all purposes by reference. In addition, as to each term used it should be understood that unless its utilization in this application is inconsistent with such interpretation, common dictionary definitions should be understood as incorporated for each term and all definitions, alternative terms, and synonyms are hereby incorporated by reference.

The inventor should be understood to have support to claim and make a statement of invention to at least: i) each of the systems and new parts thereof as herein disclosed and described, ii) the related methods disclosed and described, similar, equivalent, and even implicit variations of each of these systems, parts, and methods, iv) those alternative designs which accomplish each of the functions shown as are disclosed and described, v) those alternative designs and methods which accomplish each of the functions shown as are implicit to accomplish that which is disclosed and described, vi) each aspect, feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the inventor may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available.

To the extent that insubstantial substitutes are made, to the extent that the applicant did not in fact draft any claim so as to literally encompass any particular embodiment, and to the extent otherwise applicable, the applicant should not be understood to have in any way intended to or actually waived or relinquished such coverage.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. A reference to an element by the indefinite article "a" does not exclude the possibility that more than one of the element is present, unless the context clearly requires that there be one and only one of the elements.

Any claims set forth at any time during the pendency of the application for this patent or offspring of it are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Certain changes can be made in the subject matter without departing from the spirit and the scope of this invention. It is realized that changes are possible within the scope of this invention and it is further intended that each element or step recited herein is to be understood as referring to the step literally and/or to all equivalent elements or steps. It is intended to cover the invention as broadly as legally possible in whatever form it may be utilized.

The invention described herein is new and novel in accordance with 35 U.S.C. §102 and satisfies the conditions for patentability in §102. The invention described herein is not obvious in accordance with 35 U.S.C. §103 and satisfies the conditions for patentability in §103. The inventor may rely on the Doctrine of Equivalents to determine and assess the scope of the invention.

All patents and applications identified herein are incorporated fully herein for all purposes.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

What is claimed is:

1. A composition for treating material, the composition comprising
   a silane,
   an alcohol,
   a glycerol,
   a surfactant,
   an acetate adhesive, and
   carbon nanotubes dispersed in the composition.

2. The composition of claim 1 wherein the nanotubes are one of single-walled nanotubes and multi-walled nanotubes.

3. The composition of claim 1 wherein the acetate adhesive is one of vinyl acetate adhesive, polyvinyl acetate adhesive, and vinyl acetate ethylene emulsion.

4. The composition of claim 1 wherein said material is at least one layer or multiple layers of glass, polycarbonate material, polyester film or films, and/or acrylic material.

5. The composition of claim 1 further comprising an essential oil, essential oils, and/or an essential oil blend or blends.

6. The composition of claim 5 wherein said essential oil, said essential oils and/or said essential oil blend or blends is present in the range of 40 to 250 ml per gallon of composition.

7. The composition of claim 1 wherein the carbon nanotubes are present as 0.1 to 90 weight percent of the composition.

8. The composition of claim 1 wherein components of the composition are present in the following ranges, per gallon of composition:
   Alcohol: 1 cc to 30 cc
   Glycerol: 0.5 cc to 25 cc
   Silane or organosilane 3 cc to 60 cc
   Surfactant: 15 cc to 200 cc
   Essential Oils: 0.5 ml or cc to 250 ml or cc.

9. The composition of claim 1 wherein the composition comprises 2.0 cc of 91% Isopropanol; 2.0 cc of glycerol (99% pure); 6.0 cc of a silane, 3-glycidoxypropyltrimethoxysilane; 20.0 cc of surfactant; 0.500 cc of polyvinyl acetate adhesive; carbon nanotubes; and one tenth of one percent by total water weight of additional surfactant; 3784 ml of water; and, optionally, 200 microliters of essential oil.

10. The composition of claim 1 wherein said surfactants comprises one of or a combination of: anionic surfactants, cationic surfactants, ampholytic surfactants, non-ionic surfactants, alkyl sulfates and other alkylsulfuric acid surfactants of 10 to 14 carbon atoms, dodecanesulfonic acid, dodecanoylsarcosine, dodecanoic acid, cholic acid, salts thereof, sodium salts, sodium dodecylsulfate, sodium decylsulfate, sodium dodecylbenzenesulfonate ("SDBS surfactant"), sodium tetradecylsulfate, and n-dodecylphosphocholine.

11. The composition of claim 10 wherein the surfactant(s) are present in a range of from about 1 ml to about 30 ml, of surfactant per U.S. gallon (3.785 liter) of composition.

12. The composition of claim 1 wherein the carbon nanotubes are present at such a level that light emittance of said material is reduced by less than 1.5% after treatment with said composition.

13. The composition of claim 1 which when applied and then dried is between 0.01 microns to 10 microns thick.

14. The composition of claim 1 which is on one or two surfaces of a layer of material; in a multi-layer structure on any surface or surfaces of any particular layer; on adjacent surfaces of adjacent layers; with or without a coating on one or both outermost surfaces of the structure.

15. The composition of claim 1 which improves strength of said material by at least 20%.

16. The composition of claim 1 wherein the carbon nanotubes are present as 4 to 15 weight percent of the composition.

17. The composition of claim 1 wherein the carbon nanotubes are present as 0.1 to 2 weight percent of the composition.

18. The composition of claim 1 wherein the carbon nanotubes are present as 50 mg per gallon of composition.

19. The composition of claim 1 wherein the carbon nanotubes are present as 125 mg per gallon of composition.

20. The composition of claim 1 wherein the carbon nanotubes are present as 200 mg per gallon of composition.

21. The composition of claim 1 wherein the carbon nanotubes are present as between 50 mg to 200 mg per gallon of composition.

22. The composition of claim 10 wherein the surfactant(s) are present in a range of 0.005% to 5% weight percent of composition.

23. The composition of claim 1 which improves strength of said material by at least 50%.

24. A composition for treating material, the composition comprising a silane, an alcohol, a glycerol, an acetate adhesive, and carbon nanotubes dispersed in the composition.

25. The composition of claim 1 wherein said surfactants comprises one of or a combination of ampholytic surfactants, alkyl sulfates and other alkylsulfuric acid surfactants of 10 to 14 carbon atoms, dodecanesulfonic acid, dodecanoylsarcosine, dodecanoic acid, cholic acid, salts thereof, sodium salts, sodium dodecylsulfate, sodium decylsulfate, sodium dodecylbenzenesulfonate ("SDBS surfactant"), sodium tetradecylsulfate, and n-dodecylphosphocholine.

* * * * *